US006874216B1

(12) United States Patent
Bennett

(10) Patent No.: US 6,874,216 B1
(45) Date of Patent: Apr. 5, 2005

(54) CATCH PAN FOR EXTRACTING ENGINE VALVE LIFTERS

(76) Inventor: Gregory D. Bennett, 1460 Ridgecrest Ave., Kingsport, TN (US) 37660

(*) Notice: Subject to any disclaimer, the term of this patent is extended or adjusted under 35 U.S.C. 154(b) by 156 days.

(21) Appl. No.: 10/409,811

(22) Filed: Apr. 9, 2003

(51) Int. Cl.[7] .................................... B23P 19/04
(52) U.S. Cl. .................................... 29/213.1
(58) Field of Search .................... 29/213 R, 213 E, 29/214, 281.1, 282, 283, 888.1, 523; 165/134.1; 269/15, 16

(56) References Cited

U.S. PATENT DOCUMENTS

| | | | | |
|---|---|---|---|---|
| 1,389,233 A | | 8/1921 | West | |
| 1,415,968 A | | 5/1922 | Wilson | |
| 1,556,882 A | | 10/1925 | Weaver | |
| 2,912,194 A | | 11/1959 | Hutterer | |
| 3,979,811 A | | 9/1976 | Kammeraad | |
| 4,140,306 A | | 2/1979 | Wheeler | |
| 4,228,978 A | * | 10/1980 | Rand | 248/49 |
| 4,450,609 A | | 5/1984 | Hamilton | |
| 4,487,404 A | | 12/1984 | Martinez | |
| 4,687,185 A | | 8/1987 | Urano | |
| 4,835,832 A | | 6/1989 | Arnold | |
| 4,996,768 A | | 3/1991 | Seyller | |
| 5,220,957 A | * | 6/1993 | Hance | 165/134.1 |
| 5,280,672 A | | 1/1994 | Hochstein | |

* cited by examiner

*Primary Examiner*—Robert C. Watson
(74) *Attorney, Agent, or Firm*—Susan F. Johnston

(57) ABSTRACT

Described herein is a catch pan constructed for use in extracting damaged lifters when inserted into the camshaft receiving bore of an overhead valve engine after the camshaft has been removed. The catch pan is a narrow, elongate body defining an open reservoir therein adapted to unobstructedly receive a downwardly falling lifter. The body has an open inserting end, an opposite withdrawing end, a length at least as long as the length of the camshaft receiving bore and an outer diameter no greater than the diameter of the camshaft receiving bore. The body has a lower section, and right and left side sections extending from the lower section to upper right and left edges defining therebetween an upper opening providing access into the reservoir.

10 Claims, 3 Drawing Sheets

CATCH PAN FOR EXTRACTING ENGINE VALVE LIFTERS

FIELD OF THE INVENTION

The present invention relates to tools and methods for removing damaged lifters from an overhead valve engine. More particularly, the present invention is a tool for preventing valve lifters from inadvertently falling into the engine block during lifter replacement.

BACKGROUND OF THE INVENTION

In an overhead valve engine, a valve lifter is the unit that makes contact with the valve stem and the camshaft. The "valve lifter", as used herein, includes a valve lifter body and the enclosed valve lifter mechanism. Each valve lifter rides on an eccentric cam lobe of the camshaft. When a cam lobe pushes a valve lifter upwards into the cylindrical lifter cavity of the block it opens a valve. When the valve lifter becomes distorted, such as in mushrooming of the lower end of the valve lifter body, the valve lifter is precluded from being upwardly received back into the cylindrical lifter cavity. Such binding leads to reduced engine efficiency and failure.

Such a physically distorted, or otherwise damaged, valve lifter must often be removed from the block using manual manipulation via access through the camshaft receiving bore, after the camshaft is first withdrawing from the camshaft receiving bore. A secondary problem that can occur during this type of repair process is for a valve lifter to inadvertently fall downwardly into the lower bowels of the block, thus requiring a significantly greater amount of effort and time to retrieve. Naturally, the fact of breaking down the engine block poses additional risks that should be avoided if possible.

Accordingly, it is the object of the present invention to provide a tool for eliminating the risk of valve lifters falling into the lower portion of the block during the process of removing and replacing damaged valve lifters in an overhead valve engine, thus allowing for faster and more successful engine repair.

BRIEF SUMMARY OF THE INVENTION

The present invention is a catch pan construct ed specifically for use while damaged lifters are being removed and/or replaced. The catch pan is insertable into the camshaft receiving bore of an overhead valve engine after the camshaft has been removed. The catch pan is a narrow, elongate body defining an upwardly open reservoir therein that is adapted to unobstructedly receive a downwardly failing valve lifter when positioned inside the camshaft receiving bore beneath the damaged valve lifter. The body of the catch pan has an open inserting end, an opposite withdrawing end, a length at least substantially as long as the length of the camshaft receiving bore and an outer diameter no greater than the diameter of the camshaft receiving bore. The body has right and left side sections extending from a lower section to upper right and left edges defining therebetween an upper opening extending into the reservoir.

DETAILED DESCRIPTION

Figure 1:
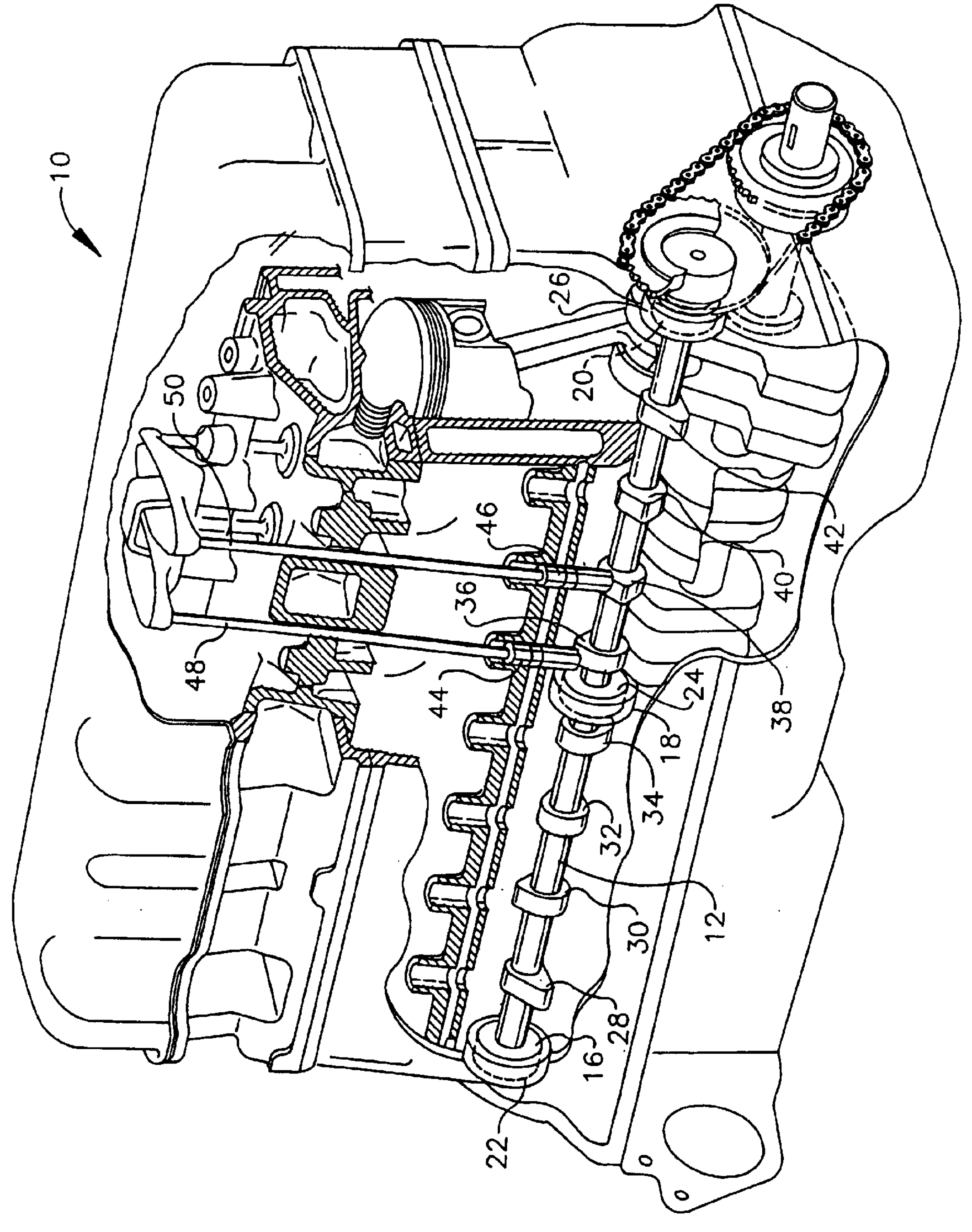
FIG. 1 illustrates a cut-away view of a block of an overhead valve engine with the camshaft in position.

Referring to FIG. 1, the block 10 of an overhead valve engine is shown having a camshaft 12 appropriately positioned in a camshaft receiving bore 14 so that the series of camshaft journals 16, 18, 20 are supported by camshaft bearings 22, 24, 26. Cam lobes, indicated by reference 28–42, are positioned between the journals. The "camshaft receiving bore" 14, as used herein, refers to the cylindrical area extending within the inner diameter of the camshaft bearings and extending the longitudinal length that would be occupied by the camshaft 12.

For illustration purposes, FIG. 1 shows valve lifters 44 and 46 connected to their corresponding valve stems 48 and 50 and riding atop cam lobes 36 and 38. In order for valve lifters 44 and 46 to be extracted through the camshaft receiving bore, the camshaft must first be withdrawn from the engine, leaving the camshaft receiving bore 14 empty, except for the presence of any valve lifters positioned in their lowermost aspect of their stroke cycle which is necessarily inside of the camshaft receiving bore.

Figure 2:
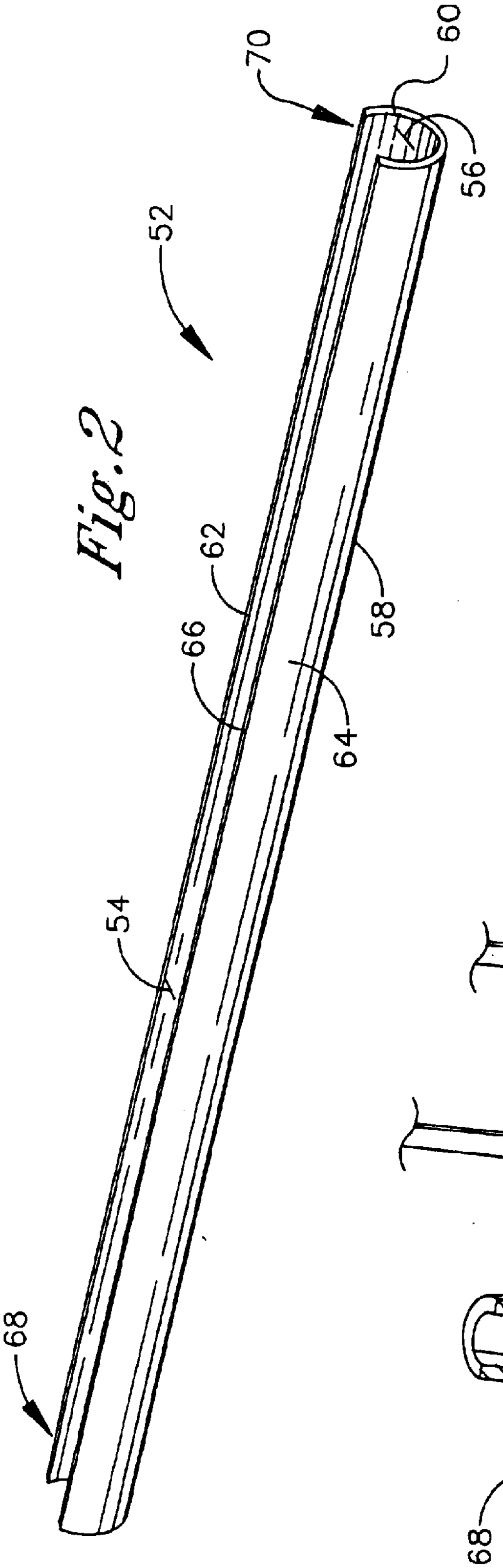
FIG. 2 illustrates a side elevation view of the catch pan of the present invention.
Figure 3:
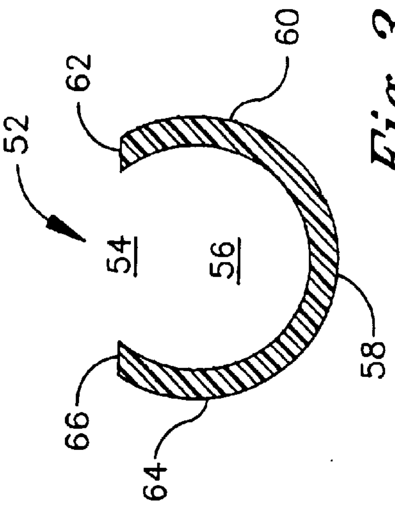
FIG. 3 is an end cross section view of the catch pan.
Figure 4:
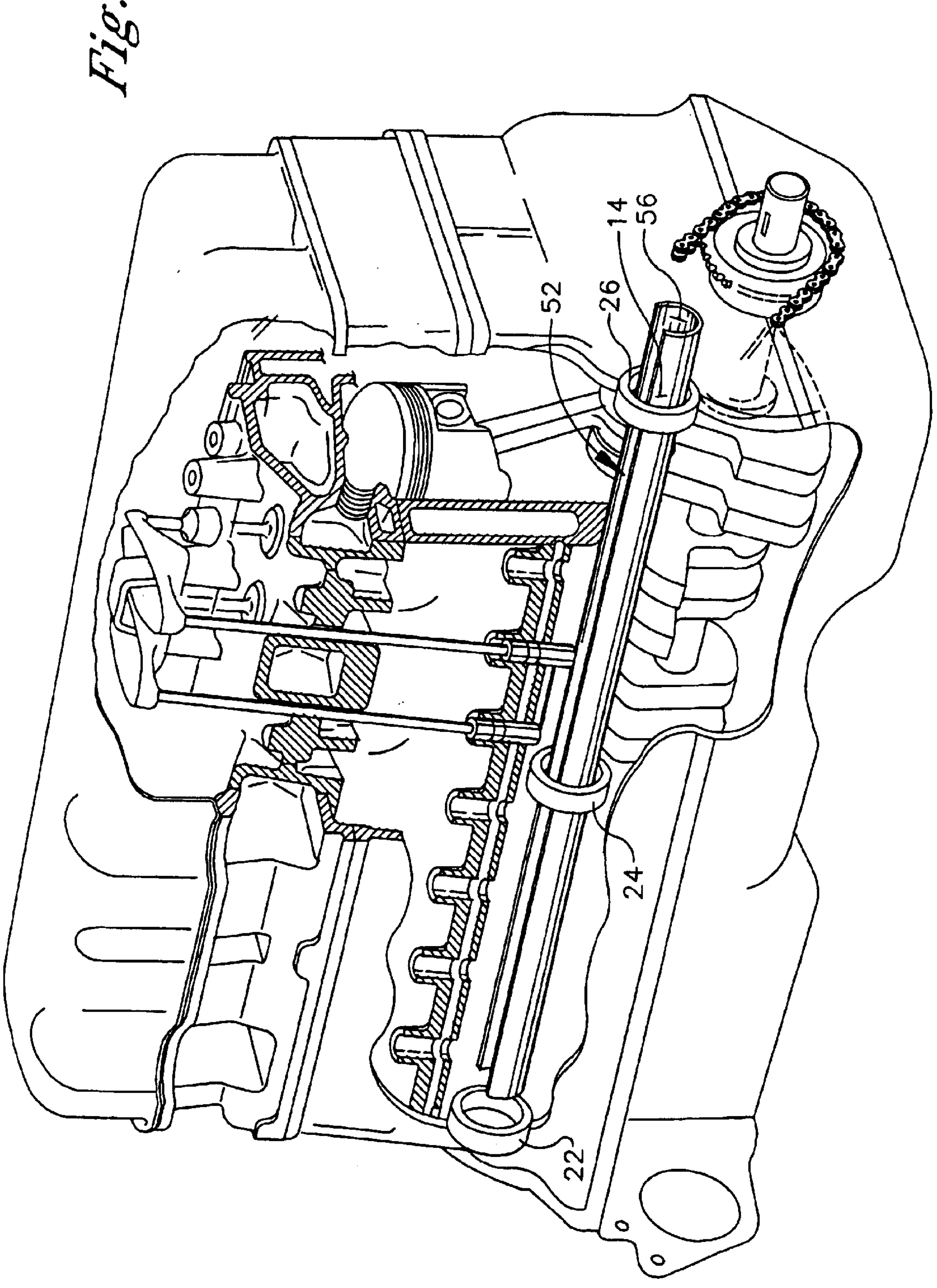
FIG. 4 illustrates the same cut-away view of the block shown in FIG. 1 except that the camshaft has been withdrawn and the present catch pan has been inserted into the camshaft receiving bore.

A preferred embodiment of the catch pan 52 of the present invention is shown in FIG. 2, with an end view illustrated in FIG. 3. It should be appreciated from FIGS. 4 and 5 that the catch pan 52 is constructed to be inserted into the camshaft receiving bore 14 so that it is supported by the camshaft bearings 22, 24, 26 in a position so that the open section 54 faces upwardly. The catch pan defines a reservoir 56 that is sufficiently open to unobstructedly receive a downwardly falling valve lifter 44 or 46 when the catch pan 52 is positioned inside the camshaft receiving bore 14 of the engine, as shown in FIG. 5.

With more specific reference to FIGS. 2–3, the catch pan 52 is a narrow, elongate pan having a lower section 58, a longitudinal right side section 60 ending at an upper right edge 62, and a longitudinal left side section 64 ending at an upper left edge 66. The upper right and left edges are spaced sufficiently apart from each other to define therebetween an upper opening 54 having a width and a length sufficiently adapted to unobstructedly receive a downwardly falling valve lifter into the reservoir 56. Thus, it can be appreciated that the width of the upper opening 54 must be greater than the diameter of a valve lifter.

While it is preferable for the pan 52 to have a cylindrical body, as shown in the drawings to allow for smooth insertion and withdrawal into the engine, the pan can also be straight sided. The catch pan 52 is at least substantially as long as the length of the camshaft receiving bore 14 so that it can be inserted as far back into the bore 14 as the last valve lifter and still be easily withdrawn from the bore 14 after use. The catch pan 52 is no wider (outer diameter) than the diameter of the camshaft receiving bore 14 so that the catch pan can be inserted through and supported by the bearings in the same manner of a camshaft. The outer diameter of the catch pan is preferably between 0.7 to 1.0 times, more preferably 0.85 to 0.95 times, the diameter of the camshaft receiving bore.

Figure 5:
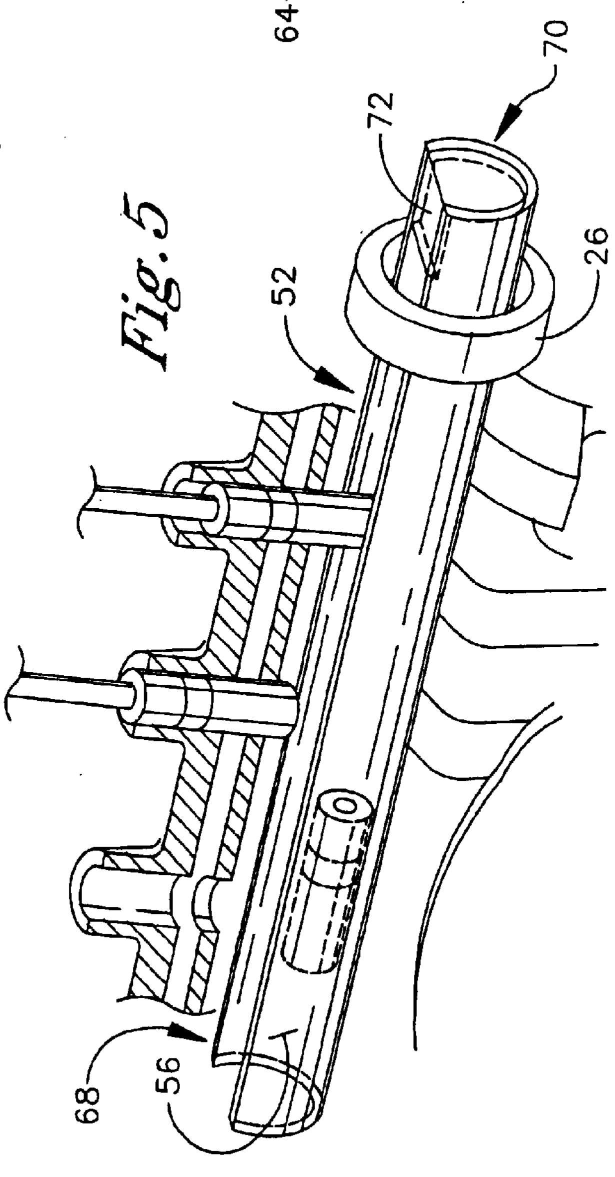
FIG. 5 illustrates a partial view of the catch pan in use as shown in FIG. 4, as used in catching a fallen valve lifter.

In order to accommodate placement of the catch pan 52 under and past valve lifters hanging inside the bore 14, as shown in FIG. 5, the catch pan must have an open inserting end 68. The opposite withdrawing end 70 may be either open or enclosed. The withdrawing end 70 is preferably enclosed for more convenient retrieval of the extracted valve lifter as shown in FIG. 5. In an alternative embodiment, the catch pan includes an additional short member 72 extending between the upper opening and the enclosed withdrawing end 70 to form a cup.

The catch pan of the present invention is preferably formed from a thermoform plastic, but can be formed from any rigid material such as sheet metal. While the material used must be rigid, it can be nonporous or a porous material such as a screen. It should be appreciated that common manufacturing techniques such as blow molding, thermoforming, and welding are sufficient for making the catch pan.

In the drawings and specification, there have been disclosed typical preferred embodiments of the invention and, although specific terms are employed, they are used in a generic and descriptive sense only and not for purposes or limitation, the scope of the invention being set forth in the following claims.

What is claimed is:

1. A catch pan for extracting damaged lifters from an overhead valve engine including a camshaft receiving bore having a length and a diameter, said catch pan comprising:

a narrow, elongate pan having a lower section, a longitudinal right side section extending from said lower section to an upper right edge, a longitudinal left side section extending from said lower section to an upper left edge, an open inserting end, an opposite, enclosed withdrawing end, a length at least substantially as long as the length of the camshaft receiving bore and an outer width between 0.7 to 1.0 times the diameter of the camshaft receiving bore, wherein said lower section, said right side section and said left side section define a reservoir sufficiently open to unobstructedly receive a downwardly falling lifter when said catch pan is positioned inside the camshaft receiving bore of the engine.

2. The catch pan according to claim 1 further comprising an enclosed member extending between said upper opening and said withdrawing end to form a cup at said withdrawing end.

3. The catch pan according to claim 1 wherein the length of said pan is at least as long as the length of said camshaft receiving bore.

4. The catch pan according to claim 1 wherein said catch pan is formed from a thermoform plastic.

5. The catch pan according to claim 1 wherein said catch pan is formed from a metal.

6. A catch pan for extracting damaged lifters from an overhead valve engine including a camshaft receiving bore having a length and a diameter, said catch pan comprising:

a semi-cylindrical body defining a reservoir therein, said semi-cylindrical body having an open inserting end, an opposite, enclosed withdrawing end, a length at least as long as the length of the camshaft receiving bore and an outer diameter no greater than the diameter of the camshaft receiving bore, said semi-cylindrical body comprising a lower section, a right side section extending from said lower section to an upper right edge, a left side section extending from said lower section to an upper left edge, said right and left edges defining therebetween an upper opening having a width and a length extending into said reservoir, wherein said opening and said reservoir are sufficiently adapted to unobstructedly receive a downwardly falling lifter when said catch pan is positioned inside the camshaft receiving bore of the engine.

7. The catch pan according to claim 6 further comprising a member extending between said upper opening and said withdrawing end to form a cup at said withdrawing end.

8. The catch pan according to claim 6 wherein the outer diameter of said body is between about 0.7 to 1.0 times the diameter of the camshaft receiving bore.

9. The catch pan according to claim 6 wherein said catch pan is formed from a thermoform plastic.

10. The catch pan according to claim 6 wherein said catch pan is formed from a metal.

* * * * *